Patented Dec. 11, 1945

2,390,953

UNITED STATES PATENT OFFICE 2,390,953

ALKYLATION OF AROMATIC HYDROCARBONS

Sydney Mann, Narberth, Pa., assignor to The Atlantic Refining Company, Philadelphia, Pa., a corporation of Pennsylvania No Drawing. Application July 30, 1942, Serial No. 452,968

6 Claims. (Cl. 260—671)

The present invention relates to the alkylation of aromatic hydrocarbons, and more particularly the alkylation of benzene and hydrocarbons of the benzene series by means of an olefin in the presence of a phosphoric acid catalyst.

An object of this invention is the production of substantial yields of monoalkyl benzene by the reaction of benzene with a lower olefin in the presence of a supported phosphoric acid catalyst under such conditions that the activity or efficiency of the catalyst is maintained for extended periods of operation.

More particularly, this invention is concerned with a method of alkylating an aromatic hydrocarbon such as benzene with an olefin in the presence of a phosphoric acid catalyst at an alkylating temperature such that the catalyst tends to become dehydrated, and in preventing or reducing such dehydration by adding to the hydrocarbon reactants an alcohol capable of reacting to alkylate the aromatic hydrocarbon and in such an amount that the water resulting from the alkylation reaction is sufficient to prevent substantial loss of water from the catalyst at the alkylating temperature.

In accordance with the present invention, an aromatic hydrocarbon such as benzene is caused to react at an elevated temperature with an olefin such as ethylene, propylene, butylene, amylene, or the like under the influence of a catalyst comprising an acid of phosphorus, and particularly phosphoric acid supported upon a solid adsorbent. To offset the resultant loss of water from the phosphoric acid catalyst, there is added to the hydrocarbon reactants, an alcohol such as methyl alcohol, ethyl alcohol, propyl alcohol, isopropyl alcohol, butyl alcohol or amyl alcohol. As a result of the reaction, there is produced a substantial yield of an alkyl benzene, with water as a by-product. The amount of alcohol added is such that the partial pressure of the resulting water vapor will be of the order of 40% to 60% of the vapor pressure of the phosphoric acid catalyst at the alkylating temperature. The principal advantages of employing an alcohol as the source of water vapor for maintaining catalyst activity reside in the complete miscibility of the alcohol with the hydrocarbon charge, and the fact that the alcohol functions simultaneously as an alkylating agent, thereby increasing the yield of alkylated aromatic hydrocarbon product.

In carrying out the alkylation reaction in the presence of a phosphoric acid catalyst using an olefin and a lower aliphatic alcohol as alkylating agents, the alkylating reaction temperature has been found to be within the range of from 350° F. to 700° F. While the alkylation may be effected at substantially atmospheric pressure, it has been found advantageous from the standpoint of efficiency and economy to employ superatmospheric pressures between 200 and 1000 pounds/square inch. For example, in the alkylation of benzene with ethylene and ethyl alcohol to produce ethyl benzene, temperatures between 500° F. and 700° F. and pressures between 200 and 600 pounds/square inch have been found very satisfactory. Optimum conditions for producing monoethyl benzene from benzene, ethylene, and ethyl alcohol, using a supported phosphoric acid catalyst, involves a temperature of about 600° F. and a pressure between 300 and 400 pounds/square inch. On the other hand, in the production of isopropyl benzene from benzene, propylene, and isopropyl alcohol in the presence of a supported phosphoric acid catalyst, it has been found that temperatures between 400° F. and 500° F. and pressures between 200 and 400 pounds/square inch are quite satisfactory. The mole ratio of benzene to olefin may vary from 2 to 1 to 16 to 1, the preferred ratio being within the range of 5 to 1 to 12 to 1 for the production of high yields of mono-alkyl benzenes.

A feature of the present invention resides in the utilization of ordinarily liquid phosphoric acid as a catalyst in substantially solid form, this being accomplished by the use of adsorbent carriers or supporting agents such as diatomaceous earth, silica gel, silica, fuller's earth, bauxite, bentonite, acid activated bentonite, synthetic aluminum and magnesium silicates, or mixtures of two or more of these solid adsorbents. While orthophosphoric acid ($H_3PO_4$) is preferred because of its alkylating efficiency, cheapness, and availability, other acids of phosphorus may also be used, including pyrophosphoric acid ($H_4P_2O_7$), orthophosphorous acid ($H_3PO_3$), metaphosphoric acid ($HPO_3$), or mixtures of two or more of such acids. The catalyst may be prepared by mixing a liquid or liquefied phosphoric acid with the adsorbent material in the desired proportions, heating the mixture between 350° F. and 600° F., and grinding and sizing the resultant product to produce particles of the desired size, for example, 4—20 mesh, 10—30 mesh, or 30—60 mesh. Alternatively, the catalyst may be formed into tablets or pellets of suitable size and shape. In general, the catalyst compositions will comprise at least 50% by weight of an acid of phosphorus, the remainder being a solid adsorbent material of the nature above described. While the solid phosphoric acid catalysts are preferred in promoting the alkylation reaction, the phosphoric acids may also be employed in the liquid state, although less advantageously since it is more difficult to obtain adequate contact between the reactants and the catalyst. At the elevated temperature employed in effecting the alkylation reaction, the water-content of the phosphoric acid catalyst may tend to become unbalanced by excessive dehydration. This difficulty is overcome by incorporating in the benzene-olefin mixture undergoing reaction, a quantity of a lower aliphatic alcohol in such proportion that the partial pressure of the water vapor resulting from the alkylation reaction is preferably maintained at 40% to 60% of the vapor pressure of the phosphoric acid catalyst at the operating temperature. By maintaining the partial pressure of the water vapor within these limits, the water content of the catalyst may be kept at the desired value. For example, using a catalyst comprising a calcined mixture of 60% by weight of ortho phosphoric acid and 40% by weight of air-dried diatomaceous earth at an alkylating temperature of 350° F., the partial pressure of the water vapor resulting from the alkylation of the aromatic hydrocarbon with an olefin in the presence of added alcohol should fall within the range of 1.0 to 1.5 pounds/square inch. At an alkylating temperature of 400° F., the partial pressure of the water vapor should be between 2.5 and 4.0 pounds/square inch. At 500° F., between 11.0 and 17.0 pounds/square inch, at 550° F., between 18.0 and 27.0 pounds/square inch, and at 600° F., between 28.0 and 42.0 pounds/square inch. These values represent 40% to 60% of the vapor pressure of the phosphoric acid catalyst at the given temperatures. In order to completely prevent dehydration of the catalyst it would be necessary to have present in the hydrocarbon vapor or liquid passing through the catalyst, sufficient water or water vapor to produce a partial pressure of water vapor equal to 100% of the vapor pressure of the catalyst. However, the provision of water or water vapor in such an amount has been found detrimental to the physical properties of the catalyst, and particularly its resistance to attrition or breakdown. The actual quantity of alcohol to be added to supply the proper amount of water vapor will vary, depending upon the amount of hydrocarbons charged and the temperature at which the alkylation is carried out. For example, in the production of isopropyl benzene using a supported phosphoric acid catalyst at 500° F. and charging benzene at the rate of 400 volumes per hour and hydrocarbon gas containing 22% of propylene at the rate of 280 volumes per hour, it was necessary to add isopropyl alcohol at the rate of 20 to 25 volumes per hour to maintain the partial pressure of the water vapor at 12 pounds/square inch, which is equal to about 45% of the vapor pressure of the catalyst at 500° F.

The alkylation of benzene with an olefin, in the presence of an added alcohol, to produce substantial yields of alkyl benzene may be carried out by passing a mixture of the reactants, in the desired proportions, through one or more reaction vessels containing the phosphoric acid catalyst. The reactants may be preheated to the desired reaction temperature, and the contained heat may be employed to maintain the catalyst at the proper temperature, or if the heat of reaction is insufficient to maintain the desired temperature, additional heat may be supplied to the reaction vessel containing the catalyst. The introduction of the alcohol to maintain the desired partial pressure of water vapor may be carried out continuously or intermittently, and the alcohol may be added directly to the hydrocarbon charge prior to or during the heating of the charge.

While the present invention has been described with particular reference to the alkylation of an aromatic hydrocarbon such as benzene with an olefin in the presence of an alcohol having the same number of carbon atoms as the olefin, the process of this invention is also adapted to the alkylation of other aromatic hydrocarbons, for example, toluene, naphthalene, anthracene, and the like. Furthermore, the alkylation may be effected with one or a mixture of olefins, in the presence of one or a mixture of alcohols, the alcohol or alcohols having the same or different number of carbon atoms as the olefin or olefins. By varying the conditions of reaction, as well as the reactants themselves, it is possible to produce either mono- or polyalkyl aromatics containing similar or dissimilar alkyl substituents. When it is desired to introduce an unsaturated substituent into the aromatic hydrocarbon, the unsaturated lower aliphatic alcohols such as allyl alcohol, crotonyl alcohol, and the like may be employed.

I claim:

1. In the method of alkylating an aromatic hydrocarbon with an olefin in the presence of a phosphoric acid catalyst at an alkylating temperature such that the catalyst tends to become dehydrated, the improvement which comprises adding to the hydrocarbon reactants a lower aliphatic alcohol capable of reacting to alkylate the aromatic hydrocarbon and in such quantity as to maintain the partial pressure of the water vapor resulting from the alkylation reaction at 40% to 60% of the vapor pressure of the phosphoric acid catalyst at the alkylating temperature.

2. The method of alkylating an aromatic hydrocarbon, which comprises reacting an aromatic hydrocarbon with an olefin and an alcohol in the presence of a phosphoric acid catalyst under conditions to produce a substantial quantity of alkylated aromatic hydrocarbon, and regulating the quantity of alcohol in the reaction mixture to maintain the partial pressure of the water vapor resulting from the alkylation reaction at 40% to 60% of the vapor pressure of the phosphoric acid catalyst at the operating conditions.

3. The method of alkylating benzene, which comprises reacting benzene with an olefin and a lower aliphatic alcohol in the presence of a phosphoric acid catalyst under conditions to produce a substantial quantity of alkyl benzene, and regulating the quantity of lower aliphatic alcohol in the reaction mixture to maintain the partial pressure of the water vapor resulting from the alkylation reaction at 40% to 60% of the vapor pressure of the phosphoric acid catalyst at the operating conditions.

4. The method of alkylating benzene, which comprises reacting benzene with an olefin and a lower aliphatic alcohol in the presence of a phosphoric acid catalyst at a temperature between 350° F. and 700° F. and under a pressure between 200 and 1000 pounds per square inch, and regulating the quantity of lower aliphatic alcohol in the reaction mixture to maintain the partial pressure of the water vapor resulting from the alkylation reaction at 40% to 60% of the vapor pressure of the phosphoric acid catalyst at the operating conditions.

5. The method of producing ethyl benzene, which comprises reacting benzene with ethylene and ethyl alcohol in the presence of a phosphoric acid catalyst at a temperature between 500° F. and 700° F. and under a pressure between 200 and 600 pounds per square inch, and regulating the quantity of ethyl alcohol in the reaction mixture to maintain the partial pressure of the water vapor resulting from the alkylation reaction at 40% to 60% of the vapor pressure of the phosphoric acid catalyst at the operating conditions.

6. The method of producing isopropyl benzene, which comprises reacting benzene with propylene and isopropyl alcohol in the presence of a phosphoric acid catalyst at a temperature between 400° F. and 500° F. and under a pressure between 200 and 400 pounds per square inch, and regulating the quantity of isopropyl alcohol in the reaction mixture to maintain the partial pressure of the water vapor resulting from the alkylation reaction at 40% to 60% of the vapor pressure of the phosphoric acid catalyst at the operating conditions.

SYDNEY MANN.